United States Patent [19]
Hudson et al.

[11] 3,905,882
[45] Sept. 16, 1975

[54] ELECTROLYTIC ZINC SALVAGING METHOD
[76] Inventors: Harold G. Hudson, 10625 N. 37th Way, Phoenix, Ariz. 85028; Ray Brandiff, 117 W. Aubrey, Prescott, Ariz. 86301
[22] Filed: Sept. 25, 1974
[21] Appl. No.: 509,269

[52] U.S. Cl. .................................. 204/119; 204/146
[51] Int. Cl. ............................................. C22d 1/22
[58] Field of Search ........................... 204/119, 146

[56] References Cited
UNITED STATES PATENTS

| | | | |
|---|---|---|---|
| 1,299,414 | 4/1919 | Aldrich et al. | 204/119 |
| 2,539,681 | 1/1951 | Yeck et al. | 204/119 |

*Primary Examiner*—R. L. Andrews

[57] ABSTRACT

A continuous method for salvaging zinc from scrap wherein: electrowinning cells having a series of anodes and cathodes in electrical parallel and a plurality of leach tanks in which a solution of sulphuric acid and water is used to strip zinc from scrap and wherein the concentration of acid is maintained at a value which strips zinc from scrap without causing undue vaporization of the fluid and wherein the electrical energy passing relative to the anodes and cathodes in the electrowinning cells is such that a continuous plating of metal zinc from the acid solution may be accomplished without substantial depletion of water from the solution and wherein the acid solution is continuously circulated through the leach tanks and the electrowinning cells and back to the leach tanks and wherein the strongest acid solution proceeding from the electrowinning cells to the leach tanks enters the tank in which the zinc has been substantially depleted from the scrap and then is transferred onto the next tank wherein substantially more zinc remains on the scrap so that violent chemical reactions are minimized and thereby minimizing the vaporization of the acid solution so that the chemical as well as the electrical function of the system may be maintained continuously without substantially disturbing or depleting the metal stripping or electroplating capabilities of the solution.

22 Claims, 7 Drawing Figures

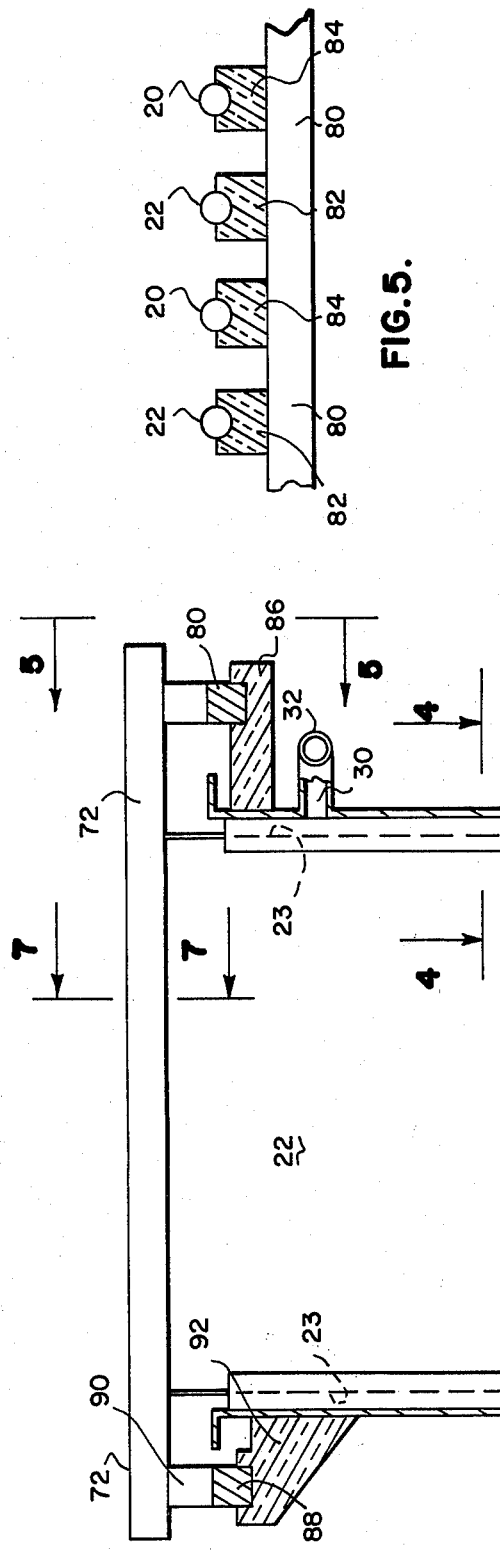
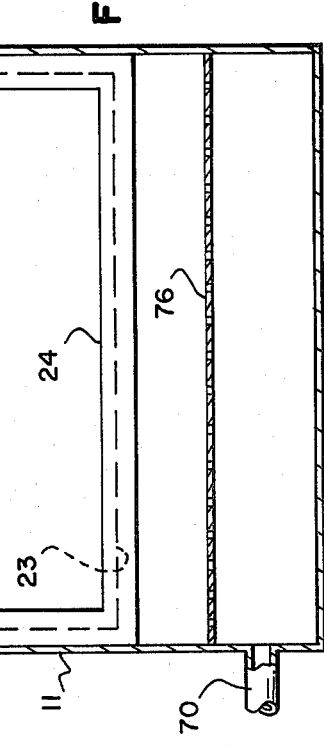
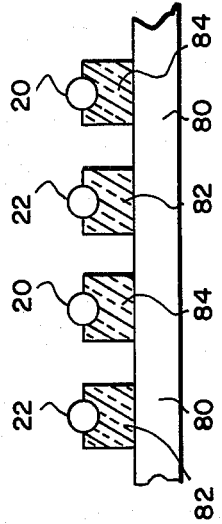
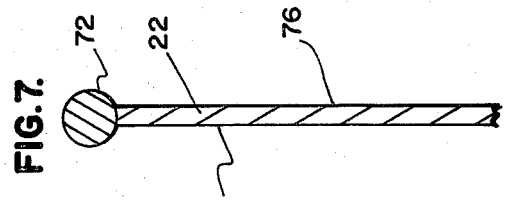

ELECTROLYTIC ZINC SALVAGING METHOD

BACKGROUND OF THE INVENTION

Zinc as well as other metals have heretofore been removed from scrap by batching processes wherein zinc laden scrap has been subjected to strong solutions of acid all of which causes substantial depletion of the acid and violent reactions which tend to cause substantial vapor losses. In such batching methods the leaching or stripping operations are first performed and then the total solution is subjected to electroplating facilities which plate the metal out at a high rate and which also causes excessive electrolysis of water and a very considerable change in acid concentration as well as current density. Accordingly, prior art methods have been difficult to control, expensive due to material losses and intermittent so as to require substantially more labor and attention. Further, proper results and the yield of high purity metals has been difficult to accomplish with the prior art batching methods.

In accordance with the present invention, the continuous method for salvaging zinc from scrap functions to maintain substantially constant acid concentration as well as proper and corresponding electrical loading of the electrowinning cells so that the method results in the production or reclaiming of high purity zinc while related metals such as iron and other materials are precipitated out of solution and not conducted to the electrowinning cells.

The continuous method of the invention is substantially automatic and requires a minimum of labor and manual control due to the stability of the acid solution which strips the zinc from scrap and which is compatible with optimum electrical loading in the electrowinning cells to avoid radical changes in acid concentration. Additionally, the invention involves method steps wherein the highest concentration of acid in the solution is conducted to scrap in one of a plurality of tanks which has the lowest concentration of remaining zinc and whereupon the acid is then conducted to a tank wherein a greater supply of zinc is available and in that instance the acid has already been depleted in concentration by dissolving some of the zinc in the previous tank and thus in all instances the relationship of the acid to the available zinc is maintained substantially at optimum conditions. Additionally, the invention comprises a novel means for separating iron and other metal impurities from the zinc bearing liquor in the system and this method step involves the precipitation of iron or other impurities from the liquor during a time when the available zinc in the solution is such that there is no substantial reaction with iron. This function occurs simply because the zinc is more reactive to sulphuric acid in the solution than is the iron and in such instances when all of the acid is substantially saturated with zinc the iron may then readily be precipitated by a novel oxygenation step so that the iron is readily precipitated in a tank as ferric iron, in fine ferric hydroxide particles. This is accomplished when the PH is elevated to approximately 3.4. As hereinafter described, this PH condition is brought about by continuous exposure of metal zinc to the solution during a time when the iron is being precipitated.

The invention also comprises novel control means for reintroducing the iron free zinc laden liquor into the electrowinning cells in a mixed relation with liquor passing from the leach tanks so that the flow of the iron free liquor may be controlled by a flow sensing control and mixed with the zinc laden liquor from the leach tanks in order to maintain a solution which will be compatible with the desired current density in the electrowinning cells so as to maintain an optimum condition therein which will support continuous plating operations to plate out the zinc on cathodes of the electrowinning cells.

Accordingly, it is an object of the present invention to provide a novel continuous method for salvaging zinc from zinc plated metal scrap or the like.

Another object of the invention is to provide an economical method for salvaging zinc from zinc plated metal scrap.

Another object of the invention is to provide a method by which continuous stripping of zinc from scrap and plating of zinc on cathodes in electrowinning cells may be accomplished with stability of the leaching liquor as well as the electrolytic action in the electrowinning cells so as to maintain a stable continuous method of operation.

Another object of the invention is to provide a method wherein impurities such as iron or the like are precipitated from the solution whereby zinc plated on the cathodes of the electrowinning cells of the invention is of a high purity.

Another object of the invention is to provide a method by which zinc may be continuously stripped from metal scrap and plated on cathodes of electrowinning cells while at the same time performing a very efficient cleaning operation on metal scrap such as sheet metal whereby the metal scrap is in excellent condition for recycling or various subsequent uses.

Further objects and advantages of the invention may be apparent from the following specification, appended claims and accompanying drawings.

BRIEF DESCRIPTION OF THE DRAWINGS

FIG. 3 is an enlarged fragmentary sectional view taken from the line 3—3 of FIG. 1;

FIG. 4 is an enlarged fragmentary sectional view taken from the line 4—4 of FIG. 3;

FIG. 5 is a fragmentary elevational view taken from the line 5—5 of FIG. 3;

FIG. 6 is a diagrammatic view of the electrical connections to the anodes and cathodes of the electrowinning cells of the aparatus shown in FIG. 1; and FIG. 7 is an enlarged fragmentary sectional view taken from the line 7—7 of FIG. 3.

DESCRIPTION OF THE PREFERRED EMBODIMENTS

Figure 1:
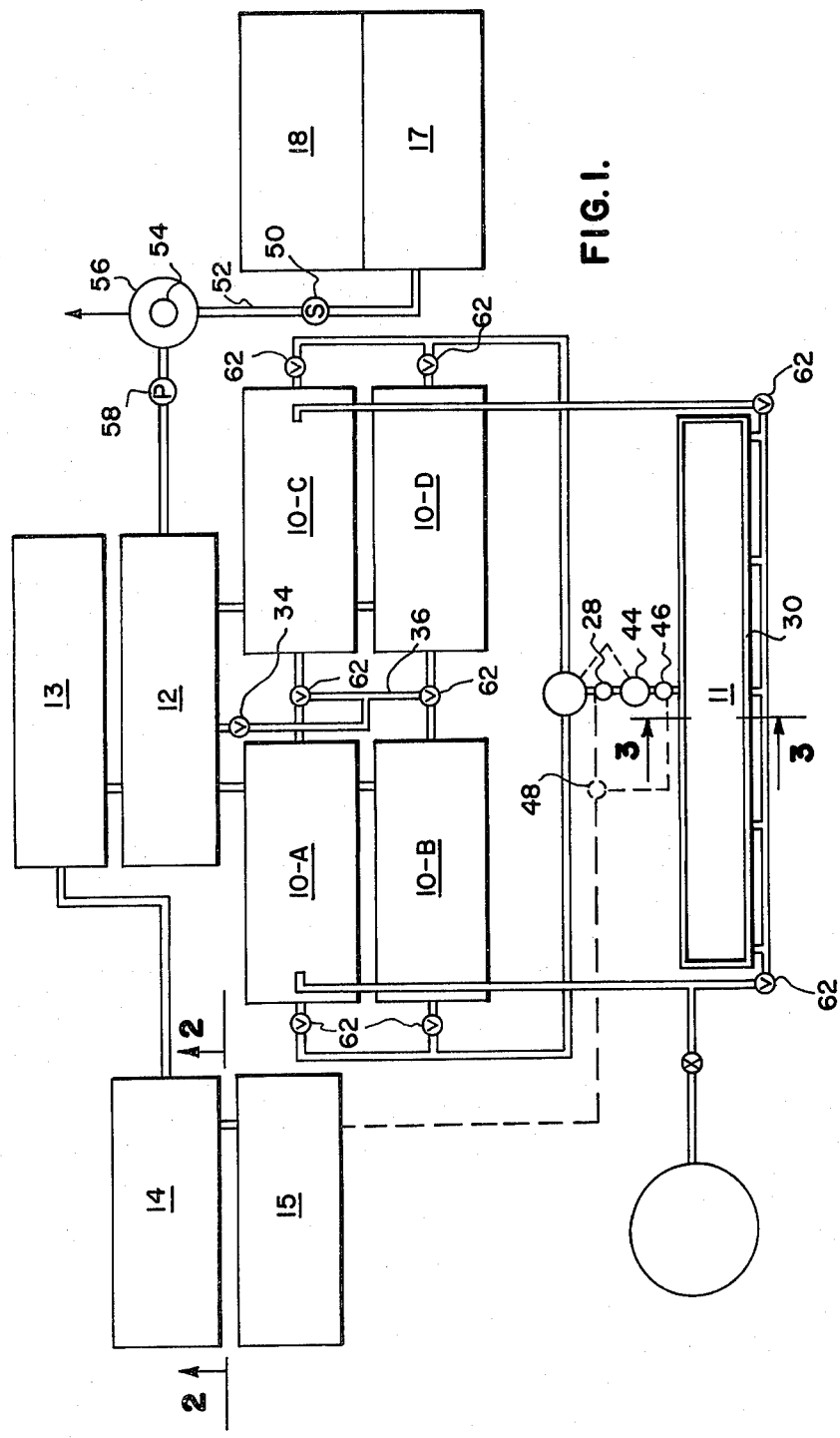
FIG. 1 is a diagrammatic planned view of tanks, electrowinning cells and other equipment used in the operation of a continuous method for salvaging zinc from scrap material in accordance with the invention.

The apparatus of the invention is composed of the following primary tanks 10 through 15 and secondary tanks 17 and 18. The tank circuit contains a solution composed of 100 grams sulphuric acid per liter of water and approximately 60 grams per liter zinc.

Leach tanks 10A, 10B, 10C and 10D; four tanks being required with any two in use at any given time. The volume of each tank is required to be 1.2 cubic feet per each 100 amperes of current in the electrolytic tank 11.

The electrolytic tank 11 comprises a plurality of electrowinning cells arranged in electrical series and each cell containing anode and cathode sheets 20 and 22 respectively arranged in electric parallel. The anodes are lead with approximately 5% antimom. The cathodes are commercial grade titanium. They are arranged with their flat sides facing each other with a spacing of 1 1/2 inches. The immersed area of the lead anodes is 90% of that of the cathodes. The cathodes edges 23 sides and bottom are shielded by a slotted piece of wood or plastic 24. This prevents the buildup of zinc for the first (approximately) one quarter inch from the edge of the sheet and facilitates easy removal of the deposited metal and also prevents dendritic growth at the sheet corners.

As shown in FIG. 3, the electrowinning cell tank 11 is provided with an inlet 70 in its lower area above which a screen 26 is disposed. This screen 26 may be a mesh screen or a baffle with a plurality of holes in it to provide for uniform upward flow of zinc laden liquor to the anodes and cathodes of the electrowinning cells.

As shown in FIGS. 3 and 4 of the drawings, the cathodes and anodes 20 and 22 are suspended in the tank 11 and the cross section of anodes and cathodes are shown in FIG. 7 wherein a cathode 22 is disclosed, the cross section of this cathode 22 is similar to the cross section of the anodes 20 and the upper edge portion of each anode and cathode is provided with a bar such as the integral bar 72 shown in FIG. 7.

Opposite sides 74 and 76 of each cathode is adapted to provide a surface on which zinc may be electroplated and as hereinbefore described, the edges 23 of the cathodes 22 are held in grooves 78 in the wooden members 24 hereinbefore described and which prevents dendritic growth of the plated zinc at the edges of the cathodes.

Each cathode 22 is suspended by means of its bar 72 which is coupled to a conductor 80 by means of an upstanding conductive cradle 82 as shown best in FIG. 5 of the drawings. Also shown in FIG. 5 are the anodes 20 which are insulated from the bar 80 by insulator blocks 84. These insulator blocks 84 being supported on the conductor 80 which is a substantially rigid bus bar and support and it in turn is supported on insulating supports 86 supported on the side of the tank 11.

As shown in FIGS. 4, 5 and 6 the anodes 20 are coupled to a conductor 88 which is similar to the conductor 80 and the bar portion 72 of the cathodes 22 are supported on insulator blocks 90 similar to the insulator blocks 84 shown in FIG. 5 so that all of the cathodes are coupled to the conductor 80 and insulated from the conductor 88 and all of the anodes are coupled to the conductor 88 and insulated from the conductor 80. The conductor 88 being supported on an insulating mount 92 as shown in FIG. 3 and this mount being secured to the side of the tank 11.

The tank 11 is provided with an outlet 30 as hereinbefore described which returns the acid solution to the leach tanks 10 in a manner as may be controlled by the valves 62 as will be hereinafter described.

The cells are operated at a direct current voltage of 3.8 and a current density of 16 amperes per square foot of immersed cathode. The total cathodic surface required is determined by the daily production requirement. It is the resultant of 2,480 amperes per ton of raw galvanized scrap assuming 8% zinc contained on the scrap; this may vary from 6% to 10%.

Each cell has a perforated baffle 26 situated about one inch above the cell bottom to diffuse the incoming solution flow. This results in a uniform upward flow rate over the electrode surfaces which tends to remove gas bubbles from the cathode which would otherwise adhere and cause a rough zinc deposit. Typically oxygen is generated at the anode and hydrogen at the cathodes.

The flow rate through the tank 11 is required to be 2.4 to 2.8 gallons per minute with 2.6 being optimum per every 100 amperes of current passing through the cells on tanks. This is accomplished by automatically varying delivery of the circulation pump 28 by sensing cell amperage change. Each cell has an overflow opening 30 near its top where the solution enters a pipe 32 returning to the leach section by gravity flow In passing through the cells at the required rate the solutions will yield approximately 0.2 grams per liter of zinc to the cathodes 22.

One surge tank 12 is required with a capacity of 1 1/2 times a typical leach tank such as the tanks 10. Its purpose is to hold a reserve of solution and to receive any overflow from leach tanks 10 or make up any deficiency in same by means of pump connection 34 coupled to a communicating tube 36 coupled to the tanks 10. The leach tanks 10 and surge tank 12 are all cross connected by a pipe or flume at the desired solution level of leach tanks 10 but above the maximum level in tank 12, the pump 34 runs continuously at about 1% of the main circuit volume, this results in an almost continuous overflow into the tank 12 and also assures that any impurities building up in the main circuit will be blended into the contents of the tank 12.

A holding tank 38 is required with a capacity equal to that of one of the leach tanks 10. As the process proceeds some impurities, primarily iron, will gradually build up in the solution. When this condition reaches a noticeable level two thirds of the contents of the tank 12, the iron is transferred to the tank 13 leaving behind sufficient volume to maintain flow level control by the pump 34. Tank 13 then contains a volume equal to one of the leach tanks 10.

EXAMPLE NO. 1.

Figure 2:
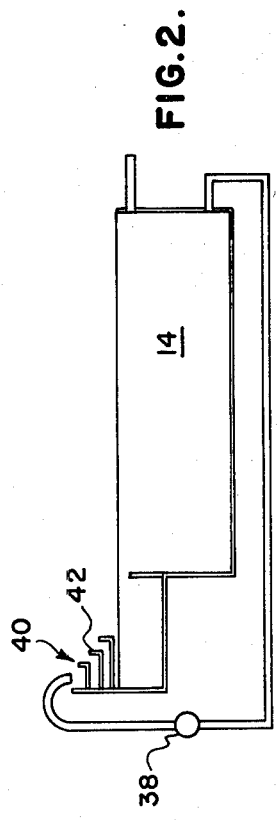
FIG. 2 is a view taken from the line 2—2 of FIG. 1 showing an impurities precipitation tank of the invention.

An iron treatment tank 14 with equal volume to a tank 10 or 13, when empty, is capable of receiving the total contents of tank 11. The configuration of tank 14 as shown in FIG. 2 is such that a quantity of galvanized scrap may be immersed exposing zinc to the solution. A circulatory flow is maintained by a pump 38 with the solution being drawn from the deep end of the tank and returning to the shallow end of the tank where it enters as a cascade 40 over elevated wirs 47. This cascading entry results in absorption of oxygen from the atmosphere. The iron contained in the solution entering tank 14 is for the most part in the ferrous condition having been in generous contact with metallic zinc which tends to reduce it to ferrous. The oxygen which is absorbed from the atmosphere at the cascade acts upon the ferrous iron to render it ferric. In this form the iron will precipitate as ferric hydroxide in fine particulate form when the PH is elevated to 3.4. This elevation of PH is brought about by the continued exposure of metallic zinc to the solution. The normal condition of the solution as it emerges from the leach tanks 10 is such that very little free acid remains, most of it having combined with zinc. The PH change occurs when the remaining acid is consumed by zinc. It is obvious that having zinc metal exposed to this batch of solution will continue to reduce some of the iron to the ferrous condition but this is offset by both the introduction of oxygen at the cascade and the superior tendency of zinc to go into solution, the result being that most of the iron in the batch is precipitated as ferric hydroxide.

The time required to achieve this result will vary from between 12 hours to 24 hours, depending on ambient conditions. This time period should be sufficient to maintain the iron content at a tolerable level but should industrial practice vary, two alternates are available either of which can be applied as follows.

EXAMPLE NO. 2.

Tanks 13, 14 and 15 are eliminated and tanks 10A, 10B, 10C and 10D are used in the same manner with the electrolytic tank 11 de-energized down. This method would result in the loss of 12 to 24 hours production of zinc at about one week intervals and would also require an increased voltage, approximately 4.0 voltage, in the electrolytic tank 11 for about the first 4 hours of start up in that tank. Another consideration is that the iron hydroxide solids must be removed before resumption of electrolytic operation in the tank 11. The removal of these solids would be accomplished by means of agitating the contents of each tank to bring about a solids suspension while circulating the solution through a hydracone 44 which removes solids by centrifugal force or through a conventional filter or settling tank, no shown.

Another alternative would be to eliminate tanks 13 and 15 and two of the tanks 14 would be required each with a capacity equal to that of the main circuit including tanks 10, 11 and 12. In this example one of the tanks 14 would be filled at the beginning of each week with the solution in the main circuit and replaced by the contents of the other tank 14. This would provide abundant time to carry out iron removal in a full charge but would require about twice the total solution volume as examples hereinbefore set forth. The suspended solids would be removed by the hydrocone 44 in the same manner as hereinbefore described.

In Example No. 1, the solution, after having been brought to a PH of 3.4, is transferred to tank 14 where the solids are permitted to settle out. The clear and relatively iron free solution is then gradually reintroduced to the main circuit at the intake side of the main pump 28. The rate at which this is carried out is controlled by the solution density sensor 46 which involves two low voltage alternating current electrodes immersed in the solution stream. The solution from tank 15 is nearly saturated with zinc leaving very little free acid to promote current passage and would require a higher cell voltage should it be introduced too rapidly. The sensor electrodes sense the conductivity of the solution and permit only as much flow from tank 15 as will not increase the solution resistance to a point where it requires more than 3.8 voltage to achieve passage. Flow control 48 reacts to demand of the sensor 46.

A dip rinse tank 17 and a spray rinse pad 18 are shown in FIG. 1. The dip rinse tank volume is about one fourth that of a tank 10. When the zinc has been completely removed from the scrap charge in any tank 10, it is removed by means of an overhead supported electromagnet and immersed in tank 17 which contains water only slightly laden with zinc and acid. It is then removed and deposited on pad 18 where it is rinsed with a fresh water spray. This removes most of any adhered solids and most of any remaining solution values. The rinse water then flows down a slope into tank 17. A relatively constant level is maintained in tank 17 by means of returning it to tank 12 through small pump line 50 and 52. In its return course it is passed through a solids removal device 54, such as a hydracone, where solid particles are separated and passed together with a minor portion of the flow into a settling tank 56, as the solids settle clear solution is overflowed and passed on to tank 12 by means of a pump 58. It follows then that the total volume of spray rinse should not exceed the daily water loss in the main circuit. Water is lost to the main circuit by such factors as evaporation and electrolysis of water in the cells.

This method results in the return to the circuit of residual values which would otherwise be gradually depleted and also maintains a fairly constant dilute condition in tank 17. The clean steel scrap, after draining has completed its processing, is passed on to further treatment and use as may be desired.

METHOD AND OPERATION

At start up only one tank 10 is charged with galvanized scrap and the solution flow is started through the outboard end of the same tank while at the same time opening the flow through the inboard end of same. The two ends of any one of the other three tanks are also opened. This results in the flow of solution over the scrap in tank 10A where it begins to dissolve zinc, with the enriched solution approximately 0.2 grams per liter passing through tank 10B, in tank 11 emerging from its outboard end and passing on the cells via a collecting tank 60. When the zinc contained in the tank 10A is about 50% depleted, tank 10B is charged with scrap. Most of the zinc required to enrich the solution is taken in passing tank 10A with tank 10B being only slightly affected. When tank 10A is fully depleted tank 10B has enough remaining zinc to carry out solution enrichment. With tank 10A being fully depleted, a third tank 10 is now charged. At this point in time, the appropriate ones of the flow control valves 62 are switched in a manner that conducts the flow into the outer end of tank 10B and out of the outer end of tank 10C and passing on to the electrolytic cells in tank 11. Tank 10A is then unloaded passing the dezinced scrap to tank 17 for rinse.

The main circuit solution is maintained at a zinc density level which leaves only a small amount of free acid available for dissolving zinc in tanks 10, after leaving the electrlytic cells in tank 11, but just enough free acid available to permit current passage in cells after passing leach in tanks 10.

It can be seen that by manipulating the leach tanks 10 in the aforementioned manner, that any combination of two tanks 10 can be in circuit at all times. The reasons for this are as follows:

With the most zinc depleted tank 10 receiving the strongest acid there is assurance of a rapid and complete removal of the last remaining zinc in the charge.

Any metallic impurities which are less active than zinc and which might be plated out in the electrolytic cells are displaced by coming into generous contact with metallic zinc in the down stream tank. This constitutes a self purification feature and is maintained by always having two leach tanks active with the most depleted one receiving the incoming flow. A particulate matter which occurs in the leach tanks, such as metallic precipitates and/or airborne solids are handled in the following manner. Some will settle out in the leach tank 10 and must eventually be removed, thus the need for four leach tanks. Any suspension of solids remaining in the flow are passed through a solids removal device 44 before entering the tank 11 to prevent the gradual buildup of solids in same, and also minimizing the suspended solids in the tank 11 which might attach to the cathodic buildup resulting in impurity of recovered zinc.

RELATIONSHIP OF TOTAL ELECTRIC CURRENT, SOLUTION ENRICHMENT, AND FLOW RATE AND CURRENT DENSITY

The typical circuit solution is purposely established at a zinc enrichment level which leaves only a small quantity of free acid available. This results in a relatively slow dissolution rate of zinc in the leach tanks 10 and prevents the copious evolution of hydrogen which would occur at higher acid concentration. Should the free acid content of the solution be much higher upon entering the leach tanks 10, hydrogen bubbles would evolve so vigorously that some of the solution would be sprayed into the atmosphere, causing an undesirable and irritating environment and also resulting in loss of solution values to the surroundings. A similar condition would exist in tank 11 at the cells should the current density be substantially greater than 16 amps, per square foot. So, therefore, the current density, the total current and the flow rate of solution coupled with extravagant zinc exposure in the leach is balanced to result in a depletion of 0.2 grams per liter in passing the cells and an enrichment of the same amount in passing the leach. This balance results in a condition in which the gas evolution in both cells and the leach tanks is gentle enough to prevent the spray of solution to the atmosphere. Another reason for the relatively low current density in the cells is to promote a smooth hard and tenacious buildup of zinc on the cathodes 20 which would otherwise be rough with substantial dendritic formations. It is also required that a colloidal substance such as glycerin be added to the solution to retard any remaining tendency to form dendrites, this is a common practice in the electrometallurgical industries.

The use of aluminum cathodes is conventional for electrodeposition of zinc. In some instances, the early deposit on aluminum sheets may fall away and make contact with the anode causing a short circuit. Titanium sheets are preferred and have proven to be ideal when properly prepared. With these sheets as cathodes the optimum is achieved in both tenacity and ease of stripping the deposited zinc. They also have a long life while sheets of aluminum, etc. tend to decompose and must be replaced at intervals.

CONTROL OF SOLUTION BALANCE

It is assumed that some of the airborne solids and/or earthen material attached to the raw scrap will contain some alkaline substance which will consume some acid from the solution. It is, therefore, required that a sample of the solution be analyzed at weekly intervals to determine acid content and make up any deficiency.

REMOVED SOLIDS

In hot dip galvanized zinc typical of the scrap used in this process, one of two metals, namely, tin and cadmium are added in small quantities to bring about the spangled appearance of the galvanized coating. In this process most of either of these metals involved would occur with the removed solids mentioned before. They would, however, be combined with both airborne solids of minimal value and other airborne solids or their products. It would be advisable to sample the solids recovered to determine the feasibility of separation of the valuable constituents.

It will be obvious to those skilled in the art that various modifications may be resorted to without departing from the spirit of the invention.

We claim:

1. A continuous method for salvaging zinc from zinc-plated scrap comprising: preparing an electrowinning cell with a series of anodes and cathodes in electrical parallel; and preparing a plurality of leach tanks; charging at least two of said tanks with a solution of sulphuric acid and water and zinc; wherein the solution contains approximately 100 grams of sulphuric acid per liter of water and approximately 60 grams of zinc per liter of water; energizing said cell with electrical energy of approximately 100 amperes of current in proportion to approximately 1.2 cubic feet of solution in each leach tank; and circulating said solution progressively through said leach tanks and through said cell and back through said leach tanks to provide a continuous circuit through said leach tanks and said cell; preparing an impurities removal device in circuit with said leach tanks and said cell for removing impurities from said solution; successively placing zinc coated material in said leach tanks; circulating said solution continuously from said leach tank to said cell and plating zinc on said cathodes and recirculating the remainder of said solution back through said leach tanks; and circulating a portion of said solution through said impurities removal device and back to said cell and leach tanks.

2. The invention as defined in claim 1, wherein: said impurities removal device comprises an impurities removal tank, causing zinc and oxygen enrichment in said impurities removal tank to thereby precipitate iron into ferric hydroxide.

3. The invention as defined in claim 2, wherein: the solution is then metered from said impurities removal tank back into said cell in relation to the solution density of the zinc enriched solution passing from said impurities removal tank so as to coordinate with the optimum removal voltage requirement of said cell commensurate with minimum gaseous and vapor losses to atmosphere.

4. The invention as defined in claim 3 wherein: said solution is periodically tested and makeup water and sulphuric acid are periodically added to said solution.

5. The invention as defined in claim 4, wherein: the sulphuric acid and water are added to make up the solution set forth in claim 5.

6. The invention as defined in claim 1, wherein: said solution is subjected to centrifugal force in said impurities removal device at a location between said leach tanks and said cell.

7. The invention as defined in claim 6, wherein: sheets of zinc are periodically removed from said cathodes.

8. The invention as defined in claim 1, wherein: said cells are operated at a DC voltage of approximately 3.8 and a current density of approximately 16 amperes per square foot of immersed cathode to minimize gaseous and vaporous losses to atmosphere.

9. The invention as defined in claim 1, wherein: sheets of plated zinc are periodically removed from said cathodes.

10. A continuous method for salvaging zinc from zinc plated scrap comprising: preparing an electrowinning cell with a series of anodes and cathodes in electrical parallel; and preparing a plurality of leach tanks; charging at least two of said leach tanks with a solution of sulphuric acid and water and zinc; wherein the solution contains approximately 100 grams of sulphuric acid per liter of water and approximately 60 grams of zinc per liter of water; energizing said cell with electrical energy of approximately 100 amperes of current in proportion to approximately 1.2 cubic feet of solution in each leach tank; and circulating said solution progressively through said leach tanks to said cell and back through said leach tanks to provide a continuous flow circuit through said leach tanks and said cell; successively placing zinc-coated materials in said leach tanks; and plating zinc on said cathodes; and recirculating the remainder of said solution back through said leach tanks; and maintaining said solution as well as electrical energy and current as well as zinc loading of the leach tanks to minimize gaseous and vaporous losses to atmosphere from said tanks and said cell.

11. The invention as defined in claim 9, wherein: the flow through said leach tanks and said cell being accomplished by varying the flow by a variable delivery pump.

12. The invention as defined in claim 11, wherein: said fluid passing from the cell and having a relative great amount of free acid is conducted to the cell of one of said leach tanks having the lowest residue of zinc left on said material whereby the lowest residue is quickly stripped from said material and then conducting said solution into another of said leach tanks having a greater residue of zinc on said material and then conducting said solution back through said cell.

13. The invention as defined in claim 12, wherein: metallic impurities which are less active chemically than zinc are displaced and/or precipitated by being in the presence of a generous amount of zinc.

14. The invention as defined in claim 12, wherein: sheets of zinc are periodically removed from said cathodes.

15. The invention as defined in claim 10 wherein: said cells are operated at a DC voltage of approximately 3,8 volts and a current density of approximately 16 amperes per square foot of cathode to minimize gaseous and vaporous losses to atmosphere; and maintaining a flow rate through said cells at approximately 2.4 to 2.8 gallons per minute of solution per every 100 amperes of current passing in said cell.

16. A continuous method for salvaging zinc from zinc plated scrap comprising; preparing an electrowinning cell with a series of annodes and cathodes in electrical parallel; and preparing a plurality of leach tanks; charging at least two of said leach tanks with a solution of sulphuric acid and water and zinc; wherein the solution contains approximately 100 grams of sulphuric acid per liter of water and approximately 60 grams of zinc per liter of water; energizing said cell with electrical energy approximating 100 amperes of current in proportion to approximate 1.2 cubic feet of solution in each leach tank and circulating said solution progressively through said leach tank to said cell and back through said leach tank to provide a continuous circuit through said leach tanks and said cell by circulating said solution at a rate of 2.4 to 2.8 gallons per minute of said solution for every 100 amperes of current passing in the cell; successively placing zinc coated materials in said leach tanks; circulating said solution continuously from said leach tanks to said cell and plating zinc on said cathodes and recirculating the remaining portion of said solution back through said leach tanks; progressively leaching zinc from material by alternating loading and unloading said leach tanks with zinc coated material and stripped material respectively; and progressively conducting zinc enriched solution from one of said leach tanks to said cell with said last mentioned solution being conducted from the one of said leach tanks having only a small amount of free acid sufficient to permit said current to pass in said cell.

17. The invention as defined in claim 13, wherein: the solution is then conducted into a centrifugal solids removal device and then conducting said solution into said cells to prevent the impurities from contaminating zinc being plated on said cathodes of said cell.

18. The invention as defined in claim 16, wherein: said solution is maintained at a zinc enrichment condition wherein only a small quantity of free acid is available thereby resulting in a slow dissolution of zinc and thereby minimizing gaseous and vaporous losses from said leach tanks.

19. A continuous method for salvaging zinc from zinc plated scrap comprising; preparing an electrowinning cell with a series of annode and cathodes in electrical parallel; preparing a plurality of leach tanks; charging at least two of said leach tanks with a solution of sulphuric acid and water and zinc; wherein the solution contains approximately 100 grams of sulphuric acid per liter of water and approximately 60 grams of zinc per liter of water; energizing said cell with electric energy of approximately 100 amperes of current in proportion to approximately 1.2 cubic feet of solution in each leach tank; circulating said solution progressively through said leach tanks to said cell and back through said leach tanks to provide a continuous circuit flow through said leach tanks and said cell by pumping said solution at a flow rate approximating 2.4 to 2.8 gallons per minute of solution per every 100 amperes of current passing in the cell; maintaining said solution in a zinc enrichment condition wherein only a small quantity of free acid is available, thereby resulting in a slow dissolution of zinc and, therefore, by minimizing gaseous and vaporous losses from said leach tanks.

20. The invention as defined in claim 19, wherein: the cell is operated at a DC voltage of approximately 3.8 and a current density of approximately 16 amperes per square foot of immersed cathode to minimize gaseous and vaporous losses from the solution in said cells.

21. The invention as defined in claim 20, wherein: said cell is operated at a DC voltage of approximately 3.8 and a current density of approximately 16 amperes per square foot of immersed cathode to minimize vaporous and gaseous losses from the solution in said cell.

22. The invention as defined in claim 21, wherein: sheets of zinc are periodically removed from said cathodes.

* * * * *